United States Patent [19]

Gregory

[11] 4,402,438

[45] Sep. 6, 1983

[54] SPREADER CONTROL

[75] Inventor: Ted W. Gregory, Libertyville, Ill.

[73] Assignee: Jackson Manufacturing Company, Harrisburg, Pa.

[21] Appl. No.: 257,667

[22] Filed: Apr. 27, 1981

[51] Int. Cl.³ .............................................. A01C 23/00
[52] U.S. Cl. ...................................... 222/625; 222/43; 239/578; 239/687; 74/501 R; 74/526
[58] Field of Search ............... 222/625, 311, 124, 559, 222/560, 561, 181, 623, 624, 41, 43, 44, 470, 471; 239/578, 681, 687; 74/501 R, 504, 489, 526, 503, 488, 487, 486

[56] References Cited

U.S. PATENT DOCUMENTS

| 3,122,273 | 12/1964 | Atkinson | 222/625 |
| 3,193,142 | 7/1965 | Atkinson | 222/181 |
| 3,907,212 | 9/1975 | Ullom | 222/625 |
| 4,121,733 | 10/1978 | McRoskey et al. | 222/625 |

FOREIGN PATENT DOCUMENTS

| 259563 | 11/1926 | Italy | 74/489 |
| 231915 | 3/1925 | United Kingdom | 74/489 |

Primary Examiner—Kenneth W. Noland
Attorney, Agent, or Firm—Trexler, Bushnell & Wolters, Ltd.

[57] ABSTRACT

A lawn spreader for particulate material such as grass seed or fertilizer has a slidable control knob immediately adjacent the handle gripping portion for movement by one or more fingers to control the rate of feed of particulate material from the spreader without removal of either hand from gripping position. An adjustable stop for the control knob is also provided adjacent the handle gripping portion for ready adjustment without stopping the spreader and without requiring the operator to bend or stoop to reach to or adjacent to the rate gate.

9 Claims, 6 Drawing Figures

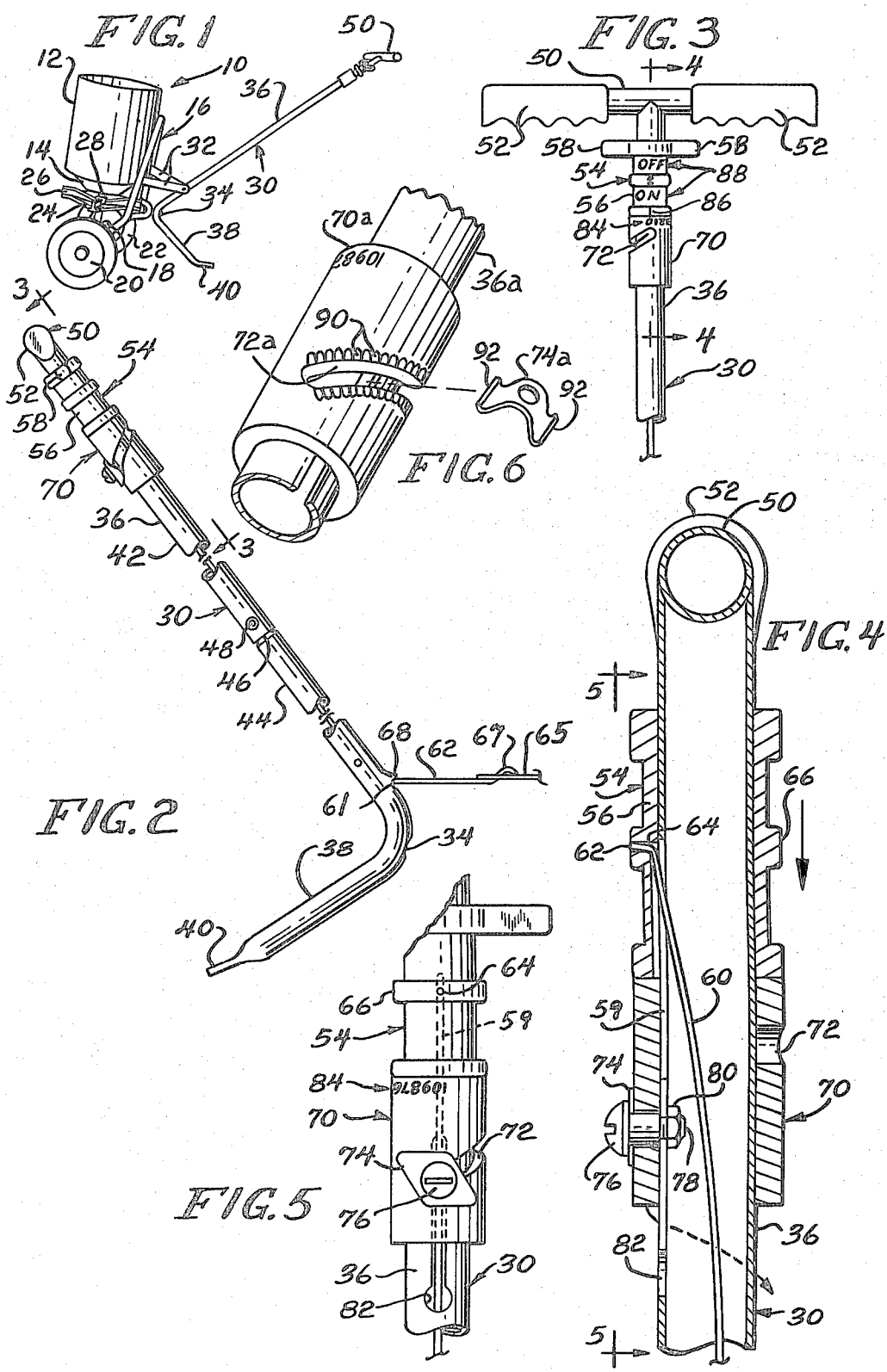

SPREADER CONTROL

The present invention relates to an improved feed control for broadcast spreaders for the spreading of seed, fertilizer, etc.

BACKGROUND OF THE INVENTION

Grass seed, fertilizer, and other substances for lawn care are often dispensed in broadcast fashion. Stated otherwise, the seed or other subject is spread substantially uniformly on the surface of the earth. Hand spreading of seed and the like is time consuming and inaccurate as to uniformity of spreading. Accordingly, various types of mechanical broadcast lawn spreaders have been developed.

One type of lawn spreader is provided with wheels and a handle for manually moving the spreader across the surface of the earth. One form of such spreader utilizes a narrow slot extending transversely of the direction of motion of the device across the earth. The narrow width of the slot is variable to determine the density of spreading. Another specific form of the generic type spreader mentioned above utilizes a spinning disc beneath the upper portion or hopper of the device. An aperture is provided at the bottom of the hopper, and a closure member is provided which may be opened or closed to different degrees to determine the rate of flow of seed or the like. When seed or the like hits the surface of the spinning disc it is centrifuged off of the disc and falls on the ground in substantially uniform distribution.

In the prior art type of broadcast lawn spreader having a rotating disc for centrifuging the dispensed material it is known to provide a rectangular opening in or near the bottom of the hopper overlying the spinning disc. The disc is spun or rotated by means of gearing from the wheels, and the speed at which the disc turns is determined by the speed at which the operator moves the spreader or apparatus.

The density or rate of dispensing particulate material from the hopper to the spinning disc is regulated by means of a sliding plate or door across the aperture, connected by means of a flexible wire or cable to a control at the top of the handle. The operator thus must remove one hand from the handle to operate the control.

In order to determine the maximum rate of dispensing, and thereby to attain the desired uniformity of material spread broadcast upon the surface of the earth it has been known to provide an adjustable limit stop interconnected with the sliding plate and the wire and in the vicinity of the sliding plate. This presents some drawbacks in that the positioning of the limit stop cannot be controlled while the spreader is moving without considerable risk of spilling the material to be spread. Spilling of fertilizer is dangerous in that too much fertilizer will kill grass. Thus, the operator must stop, lean over and then make some sort of adjustment of the limit stop. This is undesirable, because it does not allow the operator any chance to observe the density of broadcasting of material while the spreader is moving. It is rather a cut-and-try procedure, since the stop has to be adjusted and the spreader operated, followed by stopping, readjustment, and re-operating of the spreader.

OBJECTS AND BRIEF DESCRIPTION OF THE PRESENT INVENTION

The object of the present invention is to provide a disc-type lawn spreader with controls readily operable with the spreader in operation with no danger of spillage.

In accordance with the present invention a broadcast lawn spreader of the type having a spinning disc is provided with a slidable closure plate for an opening in the bottom of the hopper of the spreader. The plate is secured to a flexible wire leading to a control concentrically mounted on the elongated handle portion, and immediately below the transverse, hand-grip handle portion whereby the operator may adjust the position of the plate without removing his hands from the hand-grip portion of the handle.

In addition, a limit stop is provided on the portion of the handle immediately adjacent the operator's hands, whereby the position of the limit stop may be adjusted while the spreader is running, thereby allowing the operator thereof to make an instant judgement as to the correct density of spread without having to stop to make the adjustment, run to check the density, stop again for further adjustment, etc.

BRIEF DESCRIPTION OF THE DRAWINGS

The present invention will be best understood with reference to the ensuing specification when taken in connection with the accompanying drawings therein:

FIG. 1 is a side view of a broadcast spreader constructed in accordance with the present invention;

FIG. 2 is a side view on an enlarged scale of the handle of a broadcast lawn spreader constructed in accordance with the present invention;

FIG. 3 is a plan view of a portion of the handle as taken substantially along the line 3—3 in FIG. 2;

FIG. 4 is a longitudinal sectional view on a further enlarged scale as taken substantially along the line 4—4 in FIG. 3;

FIG. 5 is a fragmentary under-side view of the handle as taken substantially along the line 5—5 in FIG. 4; and FIG. 6 is a fragmentary perspective view of a modification of the limit stop.

DETAILED DESCRIPTION OF THE ILLUSTRATED EMBODIMENT

A broadcast spreader constructed in accordance with the present invention is shown generally at 10 in FIG. 1. The spreader 10 includes a hopper 12 open at the upper end, and having a generally downwardly converging frustoconical bottom end 14. The flat, generally horizontal extremity of the lower or bottom end portion 14 is provided with an opening (not shown, but well-known) which is covered by a sliding plate to be discussed hereinafter in greater detail.

Suitable framework 16 supports an axle 18 on which are mounted a left wheel 20 and a right wheel 22. Conveniently both wheels are constructed of plastic and are provided with rubber tires. The axle is fired to one of the wheels, for example the right wheel 22, while the other wheel is free to turn on the axle. Midway of the axle there is a conventional gear mechanism for driving a rotary disc or plate 24 beneath the opening in the hopper. The rotary plate 24 preferably has upstanding ribs or vanes 26 to insure proper distribution of the dispensed material on the rotary plate 24. The plate 24 is mounted on an upright shaft 28 which extends into the hopper 12 and has a generally radially curved wire thereon for stirring up the material to be dispensed so that it will all eventually reach the bottom opening.

Certain of the parts refered to heretofore are not shown in detail since they are well-known in the art.

The spreader 10 is provided with a handle 30 secured to a pair of converging arms or braces 32 forming part of the framework 16, and further is secured at 34 to a lower portion of the framework. The handle comprises an elongated hollow tube 36 extending diagonally rearwardly and upwardly relative to the hopper 12. The handle has a lower portion 38 extending rearwardly and diagonally downwardly from the attachment point 34, and has a flattened foot portion 40 adapted to engage the ground to form a three-point suspension with the two wheels when the spreader is in idle position.

The upper portion 36 of the handle comprises a pair of tubes (see also FIG. 2) aligned with one another. Both of the tubes are hollow and the lower one 44 thereof is of reduced diameter at its upper end at 46 to fit inside of the upper tube 42, the tubes being bolted together at 48. This two-piece construction is not material to the present invention, and it is done primarily for conservation of space in shipping.

The elongated handle portion 36 has secured thereto at its upper end a transverse hand grip portion generally parallel to the earth and extending on opposite sides of the elongated portion 36. The transverse portion preferably is supplied at its opposite ends with rubber or the like hand grips 52 (see also FIG. 3) for convenient gripping by an operator to push the spreader 10 along the surface of the earth. An operator knob 54 is positioned on the elongated handle portion 36 immediately below the transverse hand grip 50 and comprises a cylindrical sleeve portion 56 slidably mounted on the upper portion of the elongated handle portion 36. The operator knob also includes oppositely disposed finger grips 58 substantially parallel to the transverse portion 50 and readily engaged by the fingers of an operator without the necessity of removing his hands from the hand grips 52.

The underside of the elongated handle portion 36 in the vicinity of operator knob 54 is provided with an elongated slot 59. The upper end of a control wire 60 is bent substantially at right angles at 62 and is received in a radial hole 64 in the tubular portion of the operator knob 54. An annular reenforcing ring 66 is provided about the hole 64 to provide a greater length of engagement of the upper end of the wire 60 with the hole. The substantially right angular end 62 and the adjacent portion of the wire 60 extends through the elongated slot 58 and secures the operator knob 54 against rotation about the handle portion 36, thereby maintaining the finger portions 58 in proper position. As best may be seen in FIG. 2 the control wire 60 extends through the elongated handle portion 36 and exits therefrom through an aperture 61 slightly above the attachment portion 34 of the handle. The control wire 60 just before exiting from the handle is provided with a bend so that the extending wire portion 62 is substantially horizontal, and in particular is parallel to the control gate 65, being connected thereto by a bent portion 67 of the wire extending through a hole in the control gate. Preferably the material 68 at the upper edge of the opening 61 is bent somewhat outwardly to provide a surface rather than edge engagement with the horizontal portion 62 of the control wire.

The plate 65 or rate gate is slidably mounted in opposed channels under the bottom end of the hopper 12 fore-and-aft movement, and is provided with an opening which may coincide more or less with the opening in the bottom of the hopper as desired by the operator. This structure is conventional and well-known in the art and therefor is not shown in detail.

A micrometer knob or limit stop 70 encircles the elongated handle portion 36 immediately below the control rate knob 54. This limit stop or micrometer knob comprises essentially a plastic tube having a spiral slot 72 therein. Both the micrometer knob and the operator knob are made of suitable plastic material. A spring washer in the form of a parallelogram and curved on a shorter radius than the outer surface of the micrometer knob 70 overlies the slot 72, and a shoulder screw 76 extends through the spring washer 74 and through the spiral slot 72. The threaded end of the screw 78 also extends through the elongated slot 59 in the upper portion of the elongated handle portion 36 and is threaded into a nut 80. It will be observed in FIG. 5 that the slot 59 is provided with an enlarged lower end 82 to permit insertion of the nut into the handle behind the slot 59. One or more additional enlargements may be provided if desired.

It is to be appreciated that it is not desirable simply to tap a hole in the handle elongated portion 36, or to spot weld a nut to the inner portion thereof, since production tolerances can add up to the point where a fixed position for the screw would be undesirable. The nut and slot arrangement allows the base position for the screw to be set manually for each assembly. It will be appreciated that the shoulder screw allows the nut to clamp the screws tightly in position without the screw clamping the micrometer knob to where it cannot turn satisfactorily. The springwasher 74 applies sufficient pressure to the micrometer knob that it will not move accidentally, but does not clamp it against desired movement.

The top edge of the micrometer knob is labeled with indicia 84 reading from 1 through 10 and alignable with a bench mark 86 on the control knob. The numerals are upsidedown so they can readily be read by an operator standing in position to push the spreader. The control knob 54 is provided with on-off indicia 88 to indicate in which direction the control knob should be moved to open or close the gate.

A modification of the invention is shown in FIG. 6 in which adjustment of the micrometer knob is by small steps or increments, rather than by way of continuous adjustment as shown in FIGS. 3-5. To avoid unnecessary repetition similar parts in FIG. 6 are labeled with the same numbers as used heretofor, but with the addition of the suffix a. Distinctions reside in the fact that the edges of the slot 72a are provided with detents 90. Additionally, the spring washer 74a is somewhat more dished or concave toward the micrometer knob 70a and has reversely curved ends to form feet 92 received in the detents. Thus, the micrometer knob may be adjusted by increments, rather than continuously.

It will now be apparent that the micrometer knob at the top of the elongated handle portion or handle bar can be operated with one hand while the operator pushes the spreader with the other hand. In prior art spreaders with a limit stop adjustment of some sort at the bottom of the handle bar the operator had two choices in adjustment. He could stop pushing, and lean over to adjust the limit stop, which resulted in a cut-and-try approach that was time consuming and that was sure to leave part of the area to be covered with too much or too little seed or fertilizer. The other aproach was for the operator to continue pushing the spreader by one hand while endeavoring to lean over and reach down to adjust the stop while the spreader continued in motion. This approach is most unsatisfactory in that the operator can not very well see how much material is being spread while he is leaning over and adjusting the limit stop. He is likely to depart from straight line movement. There is furthermore an excellent chance of tipping over the spreader. This results in a waste of material, which in the case of fertilizer produces such a heavy concentration that the underlying lawn is almost certain to be burned out.

Somewhat similar considerations entail to the positioning of the control knob 54 since this can be moved up or down the handle bar by the use of the operator's index fingers without the necessity of moving either hand from the corresponding grip 52. This allows the operator to position the rate gate while he is in a upright position and can see exactly what is going on. Furthermore, with both hands remaining on the hand grips there is no reasonable chance that the operator will depart from his chosen path of movement of the spreader, and there is substantially no chance that the spreader will tip over.

It will be realized that most fertilizers are corrosive if wet and positioned near corrosion susceptible materials. Thus, in the prior art fertilizers were inclined to cause corrosion of the limit stop device. The micrometer knob in the present instance is located at a position where it is most unlikely to be contacted by fertilizer, thereby being unlikely to be subject to corrosion. Furthermore, due to the position of the micrometer knob is a simple matter to make it of plastic which is resistent to corrosion in any event. Furthermore, the plastic nature of the micrometer knob prevents scratching or wearing away of paint or plated material. The spring washer permits rotation of the micrometer knob for adjustment, but readily holds the knob in adjusted position. The micrometer knob in accordance with one or the other embodiments of the present invention provides for continuous or incremental adjustment. The serrations in the micrometer knob for producing incremental movement are readily realized with the use of plastic material.

The control wire 62 is made of stainless steel to resist corrosion at the lower part thereof adjacent to the rate gate. The rate gate may be provided with a suitable surface treatment to resist corrosion, while the hopper 12 generally is provided with a baked-on enamel to resist corrosion. The spinning disc or plate 24 preferably is made of a suitable plastic material, thereby again resisting corrosion.

Spinning of the plate and centrifuging of dispensed material therefrom is well-known in the art, and need not be detailed herein. The same is generally true of the coaction of the rate gate and the dispensing aperture in the bottom of the hopper.

Other types of spreaders or dispensers are known, and it will be appreciated that the micrometer knob and control handle are useful with such other types of spreaders.

Various changes in the structure as herein shown and described will no doubt occur to those skilled in the art, and will be understood as forming a part of the present invention insofar as they fall within the spirit and scope of the appended claims.

The invention is claimed as follows:

1. In a spreader of the type having a hopper for particulate material such as seed, fertilizer or the like having a dispensing opening therein and gate means for adjusting the effective size of said dispensing opening, and further having wheel means supporting said spreader for movement along the ground, amnd handle means having a gripping portion for an operator of said spreader, the combination of control means on said handle means positioned adjacent said gripping portion for manipulation by an operator without moving a hand from said gripping portion, and means interconnecting said control means and said gate means for controlling the effective size of said dispensing opening, said handle means having an elongated portion, said control means being supported from and axially movable relative to said elongated portion, said control means comprising an operator knob mounted slidably along said elongated portion for closing an opening the dispensing opening and a movable stop mounted on said elongated portion for providing fine adjustment of said operator knob in a direction along the elongated portion, said operator knob and said movable stop operably coupled to said interconnecting means to limit opening and closing of said dispensing opening by said gate means, said control means encircling said elongated portion of said handle means, said movable stop encircling said handle means elongated portion is also being movable axially thereon.

2. The combination as set forth in claim 1 wherein said elongated handle portion and said movable stop has a cooperating pin and a spiral slot for effecting axial movement of said movable stop as response to rotation thereof.

3. The combination as set forth in claim 2 and further including a spring washer acting between said pin and said movable stop to hold said movable stop in adjusted position.

4. The combination as set forth in claim 3 and further including means providing detent means adjacent said spiral slot, at least a portion of said spring washer engaging said detent means to lock said movable stop in incrementally adjusted position.

5. The combination as set forth in claim 1 wherein said movable stop has cam means for determining the axial position of said movable stop.

6. The combination as set forth in claim 1 wherein said operator knob has laterally extending finger engageable means thereon engageable by a finger of a user with the hands of the user on said handle means gripping portion.

7. In a spreader of the type having a hopper for particulate material such as seed, fertilizer or the like having a dispensing opening therein and gate means for adjusting the effective size of dispensing opening, and further having wheel means supporting said spreader for movement along the ground and handle means having an elongated portion and a gripping portion adjacent said elongated portion for an operator of said spreader, the combination of control means encircling said elongated handle portion adjacent said gripping portion and being movable thereon axially of said elongated portion, said control means comprising an operator knob mounted slidably along said elongated means for closing and opening the dispensing opening and a movable stop on said elongated portion for providing fine adjustment of said operator knob in a direction along said elongated portion, and means interconnecting said control means and said gate means for controlling the effective size of said dispensing opening, said elongated handle portion being provided with a radially extending stud and said movable stop having a spiral slot receiving said stud, whereby manual rotation of said movable stop produces movement thereof axially of said elongated handle portion, and further including a spring washer secured on said stud and pressing against said movable stop to hold said movable stop in adjusted position.

8. The combination as set forth in claim 7 wherein said movable stop has detents adjacent said spiral slot, and wherein said spring washer has a portion interfitting with said detents for holding said movable stop in incrementally adjusted position.

9. The combination as set forth in claim 7 and further including means for initially locking said stud in adjusted position axially of said elongated portion to compensate for production tolerances.

* * * * *